United States Patent
Shimoda et al.

(10) Patent No.: US 9,920,183 B2
(45) Date of Patent: Mar. 20, 2018

(54) POLYACETAL RESIN COMPOSITION AND FUEL CONTACTOR PROVIDED WITH MOLDED ARTICLE OF THE POLYACETAL RESIN COMPOSITION

(71) Applicant: Polyplastics Co., Ltd., Tokyo (JP)

(72) Inventors: Akihide Shimoda, Fuji (JP); Satomi Nakada, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/310,352

(22) PCT Filed: Mar. 12, 2015

(86) PCT No.: PCT/JP2015/057256
§ 371 (c)(1),
(2) Date: Nov. 10, 2016

(87) PCT Pub. No.: WO2016/002259
PCT Pub. Date: Jan. 7, 2016

(65) Prior Publication Data
US 2017/0204247 A1  Jul. 20, 2017

(30) Foreign Application Priority Data

Jun. 30, 2014  (JP) ................................ 2014-134835

(51) Int. Cl.
*C08K 5/17* (2006.01)
*C08K 5/134* (2006.01)
*C08K 3/22* (2006.01)

(52) U.S. Cl.
CPC ............... *C08K 5/17* (2013.01); *C08K 3/22* (2013.01); *C08K 5/1345* (2013.01); *C08K 2003/222* (2013.01); *C08K 2003/2296* (2013.01)

(58) Field of Classification Search
CPC .......... C08K 5/17; C08K 5/1345; C08K 3/22
See application file for complete search history.

(56) References Cited

U.S. PATENT DOCUMENTS 3,519,561 A * 7/1970 Britt .................. D06M 7/00
                                        252/8.61
6,284,828 B1 * 9/2001 Takayama ............... C08L 23/08
                                        524/413

7,067,571 B2 * 6/2006 Sato .................... B29C 33/62
                                        106/287.23
7,247,665 B1   7/2007 Woerner et al.
2005/0192393 A1 * 9/2005 Kimura ................. C08K 5/527
                                        524/451

FOREIGN PATENT DOCUMENTS

| EP | 580 872 | * | 2/1994 |
| JP | H07-228751 | | 8/1995 |
| JP | H10-130457 | | 5/1998 |
| JP | 2003-509521 | | 3/2003 |
| JP | 2005-330463 | | 12/2005 |
| JP | 2010-031200 | | 2/2010 |
| WO | WO 2004/058887 | | 7/2004 |

OTHER PUBLICATIONS

English language translation JP 07-228751, Aug. 1995.*

* cited by examiner

*Primary Examiner* — Margaret G Moore
(74) *Attorney, Agent, or Firm* — Knobbe Martens Olson & Bear LLP

(57) ABSTRACT

A polyacetal resin composition which, when formed into a molded article, minimizes degradation caused by contact with a fuel. This resin composition contains 100 parts by weight of a polyacetal copolymer resin, 0.1-1.0 parts by weight of a hindered phenol-based antioxidant, 0.1-2.0 parts by weight of a divalent metal oxide, and 0.5-3.0 parts by weight of an alkylene oxide adduct of an alkylamine and/or an alkylene oxide adduct of an alkylene diamine. Component contains magnesium oxide and/or zinc oxide, and component is one or more of general formulae (1) to (3). In these general formulae, X represents $(C_2H_4O)_m(C_3H_6O)_nH$, and m and n are each an integer of 0 or higher. In addition, $R_1$ is an alkyl group having 12-18 carbon atoms, and $R_2$ is an alkylene group having 2 or 3 carbon atoms.

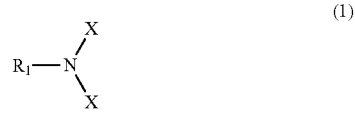

(1)

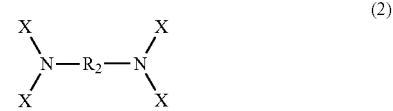

(2)

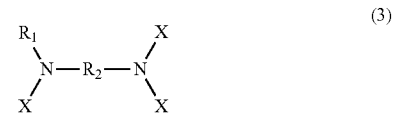

(3)

4 Claims, No Drawings

POLYACETAL RESIN COMPOSITION AND FUEL CONTACTOR PROVIDED WITH MOLDED ARTICLE OF THE POLYACETAL RESIN COMPOSITION

This application is the U.S. National Phase under 35 U.S.C. § 371 of International Application PCT/JP2015/057256, filed Mar. 12, 2015, designating the U.S., and published in Japanese as WO 2015/002259 on Jan. 7, 2016, which claims priority to Japanese Patent Application No. 2014-134835, filed Jun. 30, 2014, the entire contents of which are incorporated herein by reference.

TECHNICAL FIELD

The present invention relates to a polyacetal resin composition, and to a fuel contactor provided with a molded article of this polyacetal resin composition.

BACKGROUND ART

Polyacetal resins have excellent chemical resistance, and therefore molded articles having polyacetal resins as a raw material have been widely used in automobile components. For example, they are used as large scale components such as fuel delivery units and the like represented by fuel pump modules and the like which directly contact fuel oil.

In recent years, in order to respond to environmental regulations of various countries, sulfur reduction of fuels has been promoted. However, due to the very high cost of desulfurization facilities, in some countries high sulfur fuels are still in circulation. These high sulfur fuels, compared to low sulfur fuels, have a tendency to readily degrade polyacetal resins.

Incidentally, an injection molded article produced from a polyacetal resin will have residual stress inside the molded article resulting from the cooling when injection molding. When such an injection molded article contacts a high sulfur fuel or the like, cracks occur at locations where the residual stress is large, which may become the cause of trouble such as fuel leaks and the like. Accordingly, for countries where high sulfur fuel is in circulation, it is necessary to use as a raw material a resin material having a high resistance to high sulfur fuels.

As a polyacetal resin composition having a high acid resistance, a polyacetal resin composition comprising (A) 100 parts by weight of a polyacetal resin, (B) 0.1 to 3.0 parts by weight of a hindered phenol-based antioxidant, (C) 0.001 to 3.0 parts by weight of a nitrogen containing compound, (D) 0.1 to 3.0 parts by weight of a fatty acid calcium salt, and (E) 0.1 to 3.0 parts by weight of a lubricant has been proposed (for example, refer to Patent Document 1).

Patent Document 1: Japanese Unexamined Patent Application, Publication No. 2010-031200

DISCLOSURE OF THE INVENTION

Problems to be Solved by the Invention

However, there remains room for further improvement concerning increasing the acid resistance.

The present invention has the objective of providing a polyacetal resin composition which is capable of suppressing to a minimum degradation upon contacting a sulfur fuel when formed into a molded article.

Means for Solving the Problems

The present inventors, as a result of repeated diligent research into solving the above mentioned problem, discovered that by making the composition of the polyacetal resin composition a specified composition, the degradation upon contacting a sulfur fuel when formed into a molded article can be suppressed to a minimum, and thus completed the present invention. Specifically, the present invention provides the following.

The first aspect of the present invention is a polyacetal resin composition comprising (A) 100 parts by weight of a polyacetal copolymer resin, (B) 0.1 to 1.0 parts by weight of a hindered phenol-based antioxidant, (C) 0.1 to 2.0 parts by weight of a divalent metal oxide, and (D) 0.5 to 3.0 parts by weight of an alkylene oxide adduct of an alkylamine and/or an alkylene oxide adduct of an alkylene diamine.

The second aspect of the present invention is a polyacetal resin composition according to the first aspect, wherein the (C) divalent metal oxide comprises magnesium oxide and/or zinc oxide.

The third aspect of the present invention is a polyacetal resin composition according to the first or second aspects, wherein the (D) alkylene oxide adduct of an alkylamine and/or an alkylene oxide adduct of an alkylene diamine is one or more selected from the following formulas (1) to (3).

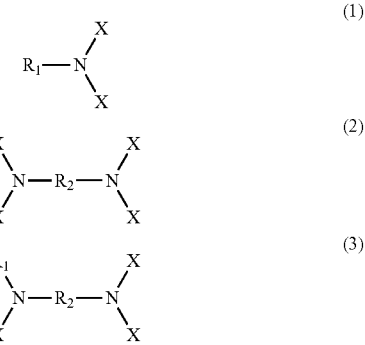

(Wherein in formulas (1) to (3), X represents $(C_2H_4O)_m(C_3H_6O)_nH$, and m and n are integers of 0 or more, moreover, $R_1$ is an alkyl group with a carbon number from 12 to 18, and $R_2$ is an alkylene group with a carbon number of 2 or 3.)

The fourth aspect of the present invention is a fuel contactor provided with a molded article of a polyacetal resin composition according to any one of the first to third aspects.

Effects of the Invention

According to the present invention, it is possible to provide a polyacetal resin composition which is capable of suppressing to a minimum degradation upon contacting a sulfur fuel when made into a molded article.

PREFERRED MODE FOR CARRYING OUT THE INVENTION

Below, detailed explanations are given concerning specific embodiments of the present invention, but the present invention is not in any way limited by these embodiments, and can be implemented with the addition of suitable modifications within the scope of the objective of the present invention.

<Polyacetal Resin Composition>

The polyacetal resin composition of the present invention comprises (A) 100 parts by weight of a polyacetal copolymer resin, (B) 0.1 to 1.0 parts by weight of a hindered phenol-based antioxidant, (C) 0.1 to 2.0 parts by weight of a divalent metal oxide, and (D) 0.5 to 3.0 parts by weight of an alkylene oxide adduct of an alkylamine and/or an alkylene oxide adduct of an alkylene diamine. Below, the (A) polyacetal copolymer resin is also referred to as component (A); the (B) hindered phenol-based antioxidant is also referred to as the component (B); the (C) divalent metal oxide is also referred to as the component (C); and the (D) alkylene oxide adduct of an alkylamine and/or alkylene oxide adduct of an alkylene diamine is also referred to as the component (D).

[(A) Polyacetal Copolymer Resin]

The polyacetal resin composition according to the present invention comprises an (A) polyacetal copolymer resin. The (A) polyacetal copolymer resin is a high polymer having oxymethylene groups ($-CH_2O-$) as its main constituent unit, and which comprises a small content of constituent units other than oxymethylene groups (comonomers). It is not preferable for the polyacetal resin composition to comprise only a polyacetal homopolymer resin instead of comprising the component (A) as the polymer component, because polyacetal homopolymer resins are easily decomposed compared to polyacetal copolymer resins, and when formed into a molded article, it is possible that degradation upon contact with a sulfur fuel will not be suppressed as suitably as in the present invention.

As the polyacetal copolymer, a polyacetal compolymer made by copolymerizing 0.5 to 30 weight % of a comonomer component is preferable, and one made by copolymerizing 0.5 to 10 weight % of a comonomer component is especially preferable. A polyacetal copolymer made by copolymerizing with a comonomer component can maintain excellent thermal stability, mechanical strength and the like, in addition to excellent acid resistance. Further, the polyacetal copolymer may be not only one with a molecule having a straight chain structure, but also one having a branched structure or crosslinked structure.

For a polyacetal copolymer to have such a structure, as the main monomer, a cyclic oligomer of formaldehyde represented by trioxane is used. Further, as the comonomer component, at least one compound selected from cyclic ethers and/or cyclic formals having a carbon-carbon bond is used. As such a comonomer, for example, ethylene oxide, 1,3-dioxolane, diethylglycol formal, 1,4-butanediol formal, 1,3-dioxane, propylene oxide and the like may be mentioned.

In an (A) polyacetal copolymer resin such as described above, the polymerization degree and the like thereof is not particularly limited, and the polymerization degree and the like may be adjusted depending on the target use and molding means and the like, but from the viewpoint of reconciling the acid resistance and moldability, a melt index (MI) measured at a temperature of 190° C. and a load of 2.16 kg of 1 to 100 g/10 min is preferable, and 5 to 30 g/10 min is especially preferable.

[(B) Hindered Phenol-Based Antioxidant]

The polyacetal resin composition according to the present invention comprises a (B) hindered phenol-based antioxidant. As the (B) hindered phenol-based antioxidant, 2,2'-methylenebis(4-methyl-6-t-butylphenol), hexamethylene glycol-bis(3,5-di-t-butyl-4-hydroxyhydrocinnamate), tetrakis[methylene 3(3,5-di-t-butyl-4-hydroxyphenyl)propionate]methane, triethylene glycol-bis-3-(3-t-butyl-4-hydroxy-5-methylphenyl)propionate, 1,3,5-trimethyl-2,4,6-tris(3,5-di-t-butyl-4-hydroxy-benzyl)benzene, n-octadecyl-3-(4'-hydroxy-3',5'-di-t-butylphenol)propionate, 4,4'-methylene bis(2,6-di-t-butylphenol), 4,4'-butylidene-bis-(6-t-butyl-3-methyl-phenol), di-stearyl-3,5-di-t-butyl-4-hydroxybenzylphosphonate, 2-t-butyl-6-(3-t-butyl-5-methyl-2-hydroxybenzyl)-4-methylphenylacrylate, 3,9-bis{2-[3-(3-t-butyl-4-hydroxy-5-methylphenyl)propionyloxy]-1,1-dimethylethyl}-2,4,8,10-tetraoxaspiro[5,5]undecane and the like may be mentioned as examples.

In the present invention, at least one, or two or more selected from these antioxidants may be used.

The content of the (B) hindered phenol-based antioxidant in the present invention is 0.1 to 1.0 parts by weight with respect to 100 parts by weight of the (A) polyacetal copolymer resin, and 0.2 to 0.5 parts by weight is more preferable. If the blended amount of the (B) antioxidant is low, not only will the antioxidant characteristics which are its intrinsic objective be insufficient, but also, the fuel resistance which is the objective of the present invention will also inferior. If the blended amount of the (B) antioxidant is excessive, a non-preferable effect on the mechanical properties and moldability and the like of the resin composition will arise.

[(C) Divalent Metal Oxide]

The polyacetal resin composition according to the present invention comprises a (C) divalent metal oxide. If the polyacetal resin composition does not comprise the component (C), when the resin molded article is immersed in a sulfur fuel, the resin molded article is degraded by the sulfur fuel, and the resin molded article may dissipate.

Further, even if the polyacetal resin composition comprises a metal oxide, if the valence of this metal oxide is not divalent, when formed into a molded article, it is possible that the degradation upon contacting a sulfur fuel will not be suppressed as suitably as in the present invention.

The type of the (C) divalent metal oxide is not particularly limited, but in the point of having high general usefulness and being readily available, the (C) divalent metal oxide is preferably magnesium oxide and/or zinc oxide. Among these, in the point of the resin molded article having a higher acid resistance, the (C) divalent metal oxide is preferably zinc oxide.

The content of the (C) divalent metal oxide used in the present invention is 0.1 to 2.0 parts by weight with respect to 100 parts by weight of the polyacetal copolymer resin, more preferably 1.0 to 2.0 parts by weight. If the blended amount of the (C) divalent metal oxide is low, the fuel resistance, which is the objective of the present invention, will be degraded. If the blended amount of the (C) divalent metal oxide is excessive, decomposition of the unstable terminal groups in the polyacetal copolymer resin is promoted, giving rise to a non-preferable effect on the mechanical properties, moldability and the like.

[(D) Alkylene Oxide Adduct of an Alkylamine and/or Alkylene Oxide Adduct of an Alkylene Diamine]

The polyacetal resin composition according to the present invention comprises a (D) alkylene oxide adduct of an alkylamine and/or an alkylene oxide adduct of an alkylene diamine. In the present invention, the structure of the component (D) is not particularly limited provided that is it one which can provide suitable sulfur fuel resistance when a molded article is formed, and for example, one or more selected from the below formulas (1) to (3) may be mentioned.

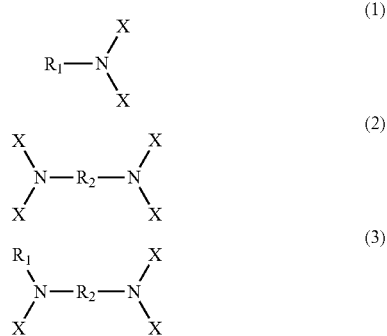

In formulas (1) to (3), X represents $(C_2H_4O)_m(C_3H_6O)_nH$, and m and n are integers of 0 or more. Further, $R_1$ is an alkyl group with a carbon number of 12 to 18, and $R_2$ is an alkylene group with a carbon number of 2 or 3.

Incidentally, the component (D) is an amine derivative, therefore it has the property of being able to neutralize a sulfur fuel. It is thought that by including the component (D) in the present invention, the acid resistance of the resin molded article is increased.

In addition, the component (D) has the property of improving the affinity of the (C) divalent metal oxide with the component (A). The affinity between the (C) divalent metal oxide itself and the (A) polyacetal copolymer resin is low, whereas there is affinity between the component (D) and the (C) divalent metal oxide, and (A) polyacetal copolymer resin. The component (D) not only increases the acid resistance due to the component (D) itself, but also increases the dispersibility of the component (C) in the component (A), and relieves stress whereby it is also thought to further contribute to improving the acid resistance due to the component (C).

The content of the component (D) is 0.5 to 3.0 parts by weight with respect to 100 parts by weight of the (A) polyacetal copolymer resin, and more preferably 1.0 to 2.5 parts by weight. If the blended amount of the component (D) is low, neither the dispersibility of the (C) divalent metal oxide in the (A) polyacetal copolymer resin, nor the neutralization of the acidic component of the sulfur fuel by the basic groups of the component (D) are sufficiently achieved, and the fuel resistance, which is the objective of the present invention, is worsened. If the blended amount of the (D) alkylene oxide adduct of an alkylamine and/or alkylene oxide adduct of an alkylene diamine is excessive, it is possible that the mechanical properties of the molded article will be degraded.

In the present invention, the number average molecular weight (Mn) of the component (D) is not particularly limited, but from the viewpoint of the dispersibility in the polyacetal copolymer resin, it is preferably 500 to 50,000, and more preferably 1,000 to 30,000. Further, in the present specification, the number average molecular weight is taken as the polystyrene converted molecular weight determined by gel permeation chromatography (GPC) with tetrahydrofuran (THF) as the solvent.

<Fuel Contactor>

The fuel contactor of the present invention is provided with a molded article of the above described polyacetal resin composition. This molded article can be obtained using the above described polyacetal resin composition with a commonly used molding method, for example, molding by a method such as injection molding, extrusion molding, compression molding, blow molding, vacuum molding, foam molding, rotational molding and the like.

The fuel contactor of the present invention is preferably a sulfur fuel contactor. The sulfur fuel is not limited to a low sulfur fuel, and may also be a high sulfur fuel. Because it is possible to suppress the occurrence of cracking and maintain a favorable molded article exterior surface even when in contact with a high sulfur fuel, it is possible to suppress leakage of the fuel. Further, in the present specification, "low sulfur fuel" refers to fuel where the concentration of sulfur is 50 ppm or less, for example Japanese JIS No. 2 diesel oil, or European EN590 diesel oil or the like may be mentioned. On the other hand, "high sulfur fuel" refers to fuel where the sulfur concentration exceeds 50 ppm, and high sulfur diesel fuels or the like circulated in China, India and the like may be mentioned as examples.

EXAMPLES

Below, the present invention is specifically explained with examples, but the present invention is not limited by these examples.

TABLE 1

|  | Example | | | | Comparative Example | | | | | |
|---|---|---|---|---|---|---|---|---|---|---|
|  | 1 | 2 | 3 | 4 | 1 | 2 | 3 | 4 | 5 | 6 |
| (A) polyacetal copolymer resin | 97.7 | 97.2 | 96.7 | 95.7 | 97.7 | 98.7 | 96.7 | 98.7 | 97.7 | 97.2 |
| (B) hindered phenol-based antioxidant | 0.3 | 0.3 | 0.3 | 0.3 | 0.3 | 0.3 | 0.3 | 0.3 | 0.3 | 0.3 |
| (C1) magnesium oxide | 1.0 | 1.0 | 1.0 |  | 2.0 |  |  |  |  | 0.5 |
| (C2) zinc oxide |  |  |  | 2.0 |  | 1.0 | 1.0 |  |  |  |
| (D1) ethylene oxide adduct of stearylamine | 1.0 |  |  |  |  |  |  |  |  |  |
| (D2) ethylene oxide adduct of alkyl propylene diamine |  | 1.5 |  | 2.0 |  |  |  |  |  |  |
| (D3) ethylene oxide propylene oxide adduct of ethylene diamine |  |  | 2.0 |  |  |  |  |  |  |  |
| (D'1) polyethylene glycol |  |  |  |  |  |  | 2.0 | 1.0 |  |  |
| (D'2) polyethylene glycol monostearate |  |  |  |  |  |  |  |  | 2.0 |  |
| (D'3) polypropylene glycol |  |  |  |  |  |  |  |  |  | 2.0 |

(units: parts by weight)

Each of the components in Table 1 is as follows.

(A) Polyacetal Copolymer Resin

Polyacetal copolymer (melt index (measured at 190° C., 2160 g load): 9 g/10 min) made by copolymerizing 96.7 weight % trioxane and 3.3 weight % 1,3-dioxolane (B) Hindered Phenol-Based Antioxidant
Tetrakis[methylene 3(3,5-di-t-butyl-4-hydroxyphenyl)propionate]methane (product name: Irganox 1010, produced by BASF Corporation)
(C) Divalent Metal Oxide
(C1) Magnesium oxide (product name: MF-150, produced by Kyowa Chemical Industry Co., Ltd.)
(C2) Zinc oxide (product name: Zinc Oxide Type 1, produced by Mitsui Mining and Smelting Co., Ltd.)
(D) Alkylene oxide adduct of an alkylamine and/or alkylene oxide adduct of an alkylene diamine
(D1) Ethylene oxide adduct of stearylamine (product name: Nymeen S-210, produced by NOF Corporation)
(D2) Ethylene oxide adduct of alkyl propylene diamine (product name: Nymeen DT-208, produced by NOF Corporation)
(D3) Ethylene oxide propylene oxide adduct of ethylene diamine (product name: Unilube 32TY-650KB, produced by NOF Corporation)
(D'1) Polyethylene glycol (product name: PEG6000S, produced by Sanyo Chemical Industries, Ltd.)
(D'2) Polyethylene glycol monostearate (product name: Polyethylene glycol monostearate, produced by NOF Corporation)
(D'3) Polypropylene glycol (reagent, produced by Wako Pure Chemical Industries, Ltd.)

EXAMPLES AND COMPARATIVE EXAMPLES

Each of the components shown in Table 1 was added and mixed in the proportions shown in Table 1, and melt-kneaded in a twin screw extruder to prepare a composition in the form of pellets. Next, ASTM No. 4 dumbbell test pieces were produced with a thickness of 1 mm by injection molding using these pellets.

<Evaluation>

In order to evaluate the fuel resistance of the polyacetal resin composition, the above mentioned dumbbell test pieces were immersed in diesel fuel (product name: CEC RF 90-A-92, produced by Haltermann) at 100° C. for 14 days, and the weight change rate due to fuel immersion was calculated from the masses of the test pieces before and after the immersion. The results are shown in Table 2.

TABLE 2

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| weight change rate after 14 days (%) | −15 | −9 | −10 | −6 | −40 | −50 | −32 | −100 | −100 | −44 |

It could be confirmed (Examples 1 to 4) that a resin molded article having as a raw material a polyacetal resin composition comprising (A) 100 parts by weight of a polyacetal copolymer resin, (B) 0.1 to 1.0 parts by weight of a hindered phenol-based antioxidant, (C) 0.1 to 2.0 parts by weight of a divalent metal oxide, and (D) 0.5 to 3.0 parts by weight of an alkylene oxide adduct of an alkylamine and/or an alkylene oxide adduct of an alkylene diamine, could suppress the weight change ratio to within −15% after immersion in a sulfur fuel.

On the other hand, in the case of not comprising the component (D), it could be confirmed that by immersion in the sulfur fuel, degradation of the resin molded article arises, and the weight of the polyacetal resin composition was notably reduced (Comparative Examples 1 to 6).

It is thought that when the component (D) is included, the component (D) increases the affinity between the (C) divalent metal oxide and the (A) polyacetal copolymer resin, improves the dispersibility, and increases the resistance to an acidic component of the high sulfur fuel. Further, it is thought that the basicity of the amine groups of the component (D) neutralizes the acidic component in a sulfur fuel, and suppresses the rate of change of the weight.

The effect of increasing the dispersibility of the (C) divalent metal oxide was also confirmed in Comparative Example 3. Upon comparing Comparative Example 2 and Comparative Example 3, it was confirmed that Comparative Example 3 which comprises (D'1) polyethylene glycol, had a lower weight change ratio. In Comparative Example 3, the (D'1) polyethylene glycol increases the affinity with the (C) divalent metal oxide, and it is thought that compared to Comparative Example 2, the dispersibility of the (C) divalent metal oxide in the (A) polyacetal copolymer resin is increased.

Further, it was confirmed that in the case of not comprising the component (C), the resin molded article may dissipate due to immersion in a sulfur fuel (Comparative Examples 4 and 5). This is thought to be because the component (C) contributes to increasing the mechanical strength and chemical stability of the composition.

The invention claimed is:

1. A polyacetal resin composition comprising (A) 100 parts by weight of a polyacetal copolymer resin,
   (B) 0.1 to 1.0 parts by weight of a hindered phenol-based antioxidant,
   (C) 0.1 to 2.0 parts by weight of a divalent metal oxide, and
   (D) 0.5 to 3.0 parts by weight of an alkylene oxide adduct of an alkylamine and/or an alkylene oxide adduct of an alkylene diamine,
   wherein the (D) alkylene oxide adduct of an alkylamine and/or an alkylene oxide adduct of an alkylene diamine is one or more selected from the below formulas (2) and (3):

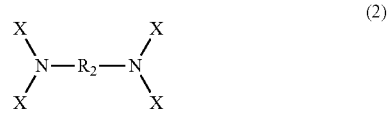

(2)

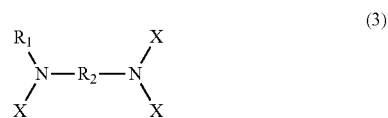

(3)

wherein, in formulas (2) and (3), X represents $(C_2H_4O)_m(C_3H_6O)_nH$, $R_1$ is an alkyl group with a carbon number of 12 to 18, and
$R_2$ is an alkylene group with a carbon number of 2 or 3, and m and n are integers of 0 or more, provided that if one of them is 0, the other is not 0.

2. The polyacetal resin composition according to claim 1 wherein the (C) divalent metal oxide comprises magnesium oxide and/or zinc oxide.

3. A fuel contactor provided with a molded article of the polyacetal resin composition according to claim 1.

4. A fuel contactor provided with a molded article of the polyacetal resin composition according to claim 2.

\* \* \* \* \*